(12) United States Patent
Dreibelbis et al.

(10) Patent No.: US 7,733,161 B2
(45) Date of Patent: *Jun. 8, 2010

(54) VOLTAGE BOOST SYSTEM, IC AND DESIGN STRUCTURE

(75) Inventors: Jeffrey H. Dreibelbis, Williston, VT (US); John A. Fifield, Underhill, VT (US)

(73) Assignee: International Business Machines Corporation, Armonk, NY (US)

( * ) Notice: Subject to any disclaimer, the term of this patent is extended or adjusted under 35 U.S.C. 154(b) by 146 days.

This patent is subject to a terminal disclaimer.

(21) Appl. No.: 12/031,729

(22) Filed: Feb. 15, 2008

(65) Prior Publication Data

US 2009/0206916 A1    Aug. 20, 2009

(51) Int. Cl.
*H02M 3/18* (2006.01)
*G05F 3/16* (2006.01)
(52) U.S. Cl. .................... 327/536; 327/537; 363/60
(58) Field of Classification Search .................. None
See application file for complete search history.

(56) References Cited

U.S. PATENT DOCUMENTS

| | | | |
|---|---|---|---|
| 4,616,303 A | 10/1986 | Mauthe | |
| 5,059,815 A | 10/1991 | Bill et al. | |
| 5,066,870 A | 11/1991 | Kobatake | |
| 5,886,566 A | 3/1999 | Park et al. | |
| 6,072,358 A | 6/2000 | Hung et al. | |
| 6,163,487 A * | 12/2000 | Ghilardelli | 365/189.09 |
| 6,236,581 B1 | 5/2001 | Foss et al. | |
| 6,466,079 B1 | 10/2002 | Kushnarenko | |
| 6,724,240 B2 | 4/2004 | Egerer | |
| 6,734,717 B2 * | 5/2004 | Min | 327/536 |
| 7,046,076 B2 | 5/2006 | Daga et al. | |
| 7,075,357 B2 * | 7/2006 | Koshita | 327/536 |
| 7,256,640 B2 | 8/2007 | Ucciardello et al. | |
| 7,403,054 B1 * | 7/2008 | Malladi et al. | 327/158 |
| 7,466,188 B2 * | 12/2008 | Fifield | 327/536 |

OTHER PUBLICATIONS

Ker et al., "Design of Charge Pump Circuit With Consideration of Gate-Oxide Reliability in Low-Voltage CMOS Processes", IEEE Journal of Solid-State Circuits, vol. 41, No. 5, May 2006, pp. 1100-1107.

(Continued)

*Primary Examiner*—Lincoln Donovan
*Assistant Examiner*—Terry L Englund
(74) *Attorney, Agent, or Firm*—W. Riyon Harding; Hoffman Warnick LLC

(57) ABSTRACT

A voltage boost system, IC and design structure are disclosed for boosting a supply voltage while preventing forward biasing of n-well structures. The voltage boost system may include a first voltage boost circuit producing a first boosted voltage using at least one voltage boost sub-circuit, each of the at least one voltage boost sub-circuit having an output passgate in an n-well; a second voltage boost circuit producing a second boosted voltage, the n-well of each output passgate being biased using the second boosted voltage, wherein the second boosted voltage is greater than the first boosted voltage. Voltage boost sub-circuits may use gate control circuitry to reduce gate oxide stress, thus allowing lower voltage level FETs to be used.

19 Claims, 4 Drawing Sheets

OTHER PUBLICATIONS

Hasan et al., "A 5V Charge Pump in a Standard 1.8V 0.18-um CMOS Process", IEEE, 2005, pp. 1899-1902.

Su et al., "Gate Control Stategies for High Efficiency Charge Pumps", IEEE, 2005, pp. 1907-1910.

Ker et al., "A New Charge Pump Circuit Dealing with Gate-Oxide Reliability Issue in Low-Voltage Processes", IEEE Journal of Solid State Circuits, ISCAS 2004, pp. I-321-I-324.

Min et al., "CMOS Charge Pumps Using Cross-Coupled Charge Transfer Switches with Improved Voltage Pumping Gain and Low Gate-Oxide Stress for Low-Voltage Memory Circuits", IEEE, 2002, pp. V-545-V-548.

Dreibelbis et al., U.S. Appl. No. 12/031,731, Office Action Communication, Sep. 3, 2009, 13 pages.

Dreibelbis et al., U.S. Appl. No. 12/031,725, Office Action Communication, Sep. 8, 2009, 17 pages.

* cited by examiner

VOLTAGE BOOST SYSTEM, IC AND DESIGN STRUCTURE

This application is related to U.S. Ser. No. 12/031,725, filed Feb. 15, 2008, currently pending and is related to U.S. Patent Application having U.S. Ser. No. 12/031,731, filed Feb. 15, 2008, and currently pending. All related U.S. Applications referenced above have common inventors and are assigned to the same assignee.

BACKGROUND OF THE INVENTION

The disclosure relates generally to voltage boost systems.

A voltage boost circuit or charge pump is an electronic circuit that uses capacitors for energy storage to create a higher voltage power source. One challenge with charge pumps is that when creating a higher voltage power source, such as in a three times a supply voltage (3×Vdd) charge pump, voltages may be generated in excess of the oxide-stress limit of a field effect transistor (FET), i.e., a stress limit of the gate oxide thickness. Previous approaches have used FET devices with an oxide stress limit greater than the output voltage of the pumping system. This situation forces inclusion of a thicker, and typically lower performance FET in a technology menu which adds cost and complexity such as additional mask steps and extra characterization requirements. For example, a "medium" gate oxide thickness FET may have a gate oxide of approximately 22 Angstroms (Å), while a thicker gate oxide, lower performance FET may require a gate oxide of approximately 52 Å. Gate voltage controllers for generating a safe gate drive level below an excessive stress level of the oxide have been implemented, but they are limited in terms of the amount of boost permissible and require a precision current source for calibration.

Another issue with charge pumps is that an output voltage will rise to levels in excess of the regulated drain (output) voltage of an output passgate. The typical approach to address this problem is tying the n-well of the passgate to the source or drain thereof. However, this creates a forward-biased junction and turns on a parasitic PNP device, rendering the charge pump inoperable.

BRIEF SUMMARY OF THE INVENTION

A voltage boost system, IC and design structure are disclosed for boosting a supply voltage while preventing forward biasing of n-well structures. The voltage boost system may include a first voltage boost circuit producing a first boosted voltage using at least one voltage boost sub-circuit, each of the at least one voltage boost sub-circuit having an output passgate in an n-well; a second voltage boost circuit producing a second boosted voltage, the n-well of each output passgate being biased using the second boosted voltage, wherein the second boosted voltage is greater than the first boosted voltage. Voltage boost sub-circuits may use gate control circuitry to reduce gate oxide stress, thus allowing lower voltage level FETs to be used.

A first aspect of the disclosure provides a voltage boost circuit for boosting a supply voltage, the voltage boost circuit comprising: a first stage for boosting the supply voltage to a first boosted voltage, the first stage including a first voltage boost capacitor with a low node and a high node, the high node having an output of the first boosted voltage; a first passgate coupled to the high node of the first stage; a first gate control circuit for generating an on-state gate voltage level for the first passgate adjusted to reduce gate oxide voltage stress on the passgate; a second stage for boosting the first boosted voltage to a second boosted voltage, the second stage including a second voltage boost capacitor with a low node coupled to the high node of the first stage and a high node, the high node of the second stage having an output of the second boosted voltage; a second passgate coupled to the high node of the second stage; and a second gate control circuit for generating an on-state gate voltage level for the second passgate adjusted to reduce gate oxide voltage stress on the second passgate.

A second aspect of the disclosure provides an integrated circuit (IC) designed to substantially operate at a supply voltage, the IC comprising: circuitry requiring a boosted voltage relative to the supply voltage; a voltage boost circuit including: a first stage for boosting the supply voltage to a first boosted voltage, the first stage including a first voltage boost capacitor with a low node and a high node, the high node having an output of the first boosted voltage, a first passgate coupled to the high node of the first stage, a first gate control circuit for generating an on-state gate voltage level for the first passgate adjusted to reduce gate oxide voltage stress on the passgate, a second stage for boosting the first boosted voltage to a second boosted voltage, the second stage including a second voltage boost capacitor with a low node coupled to the high node of the first stage and a high node, wherein the second boosted voltage is the boosted voltage required by the circuitry, the high node of the second stage having an output of the second boosted voltage, a second passgate coupled to the high node of the second stage, and a second gate control circuit for generating an on-state gate voltage level for the second passgate adjusted to reduce gate oxide voltage stress on the second passgate.

A third aspect of the disclosure provides a design structure embodied in a machine readable medium for designing, manufacturing, or testing an integrated circuit, the design structure comprising: an integrated circuit (IC) designed to substantially operate at a supply voltage, the IC including: circuitry requiring a boosted voltage relative to the supply voltage; a voltage boost circuit including: a first stage for boosting the supply voltage to a first boosted voltage, the first stage including a first voltage boost capacitor with a low node and a high node, the high node having an output of the first boosted voltage, a first passgate coupled to the high node of the first stage, a first gate control circuit for generating an on-state gate voltage level for the first passgate adjusted to reduce gate oxide voltage stress on the passgate, a second stage for boosting the first boosted voltage to a second boosted voltage, the second stage including a second voltage boost capacitor with a low node coupled to the high node of the first stage and a high node, wherein the second boosted voltage is the boosted voltage required by the circuitry, the high node of the second stage having an output of the second boosted voltage, a second passgate coupled to the high node of the second stage, and a second gate control circuit for generating an on-state gate voltage level for the second passgate adjusted to reduce gate oxide voltage stress on the second passgate.

A fourth aspect of the disclosure is directed to a voltage boost system for boosting a supply voltage, the system comprising: a first voltage boost circuit producing a first boosted voltage using at least one voltage boost sub-circuit, each of the at least one voltage boost sub-circuit having an output passgate in an n-well; and a second voltage boost circuit producing a second boosted voltage, the n-well of each output passgate being biased using the second boosted voltage, wherein the second boosted voltage is greater than the first boosted voltage.

A fifth aspect of the disclosure provides an integrated circuit (IC) designed to substantially operate at a supply voltage, the IC comprising: circuitry requiring a boosted voltage relative to the supply voltage; a voltage boost system including: a first voltage boost circuit producing a first boosted voltage using at least one voltage boost sub-circuit, each of the at least one voltage boost sub-circuit having an output passgate in an n-well; and a second voltage boost circuit producing a second boosted voltage, the n-well of each output passgate being biased using the second boosted voltage, wherein the second boosted voltage is greater than the first boosted voltage, and wherein the second boosted voltage is the boosted voltage required by the circuitry.

A sixth aspect of the disclosure provides a design structure embodied in a machine readable medium for designing, manufacturing, or testing an integrated circuit, the design structure comprising: an integrated circuit (IC) designed to substantially operate at a supply voltage, the IC including: circuitry requiring a boosted voltage relative to the supply voltage; a voltage boost system including: a first voltage boost circuit producing a first boosted voltage using at least one voltage boost sub-circuit, each of the at least one voltage boost sub-circuit having an output passgate in an n-well; and a second voltage boost circuit producing a second boosted voltage, the n-well of each output passgate being biased using the second boosted voltage, wherein the second boosted voltage is greater than the first boosted voltage, and wherein the second boosted voltage is the boosted voltage required by the circuitry.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

Figure 1:
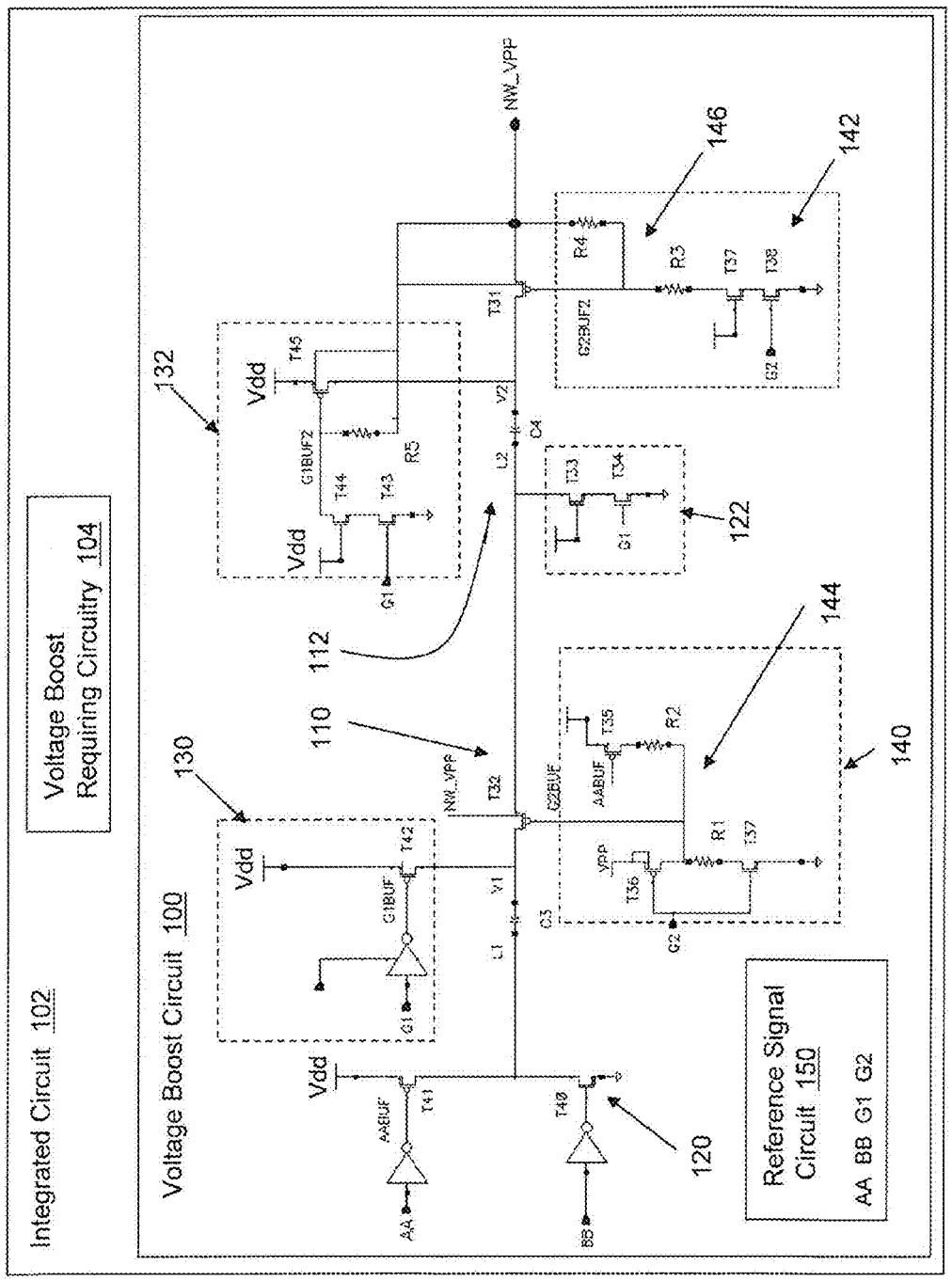
FIG. 1 shows a schematic diagram of embodiments of a two stage voltage boost circuit according to the disclosure.

FIG. 1 shows one embodiment of a voltage boost circuit 100 according to the disclosure. Voltage boost circuit 100 may be used in an integrated circuit (IC) 102 designed to substantially operate at a supply voltage Vdd. IC 102, however, includes circuitry 104 requiring a boosted voltage relative to supply voltage Vdd. Voltage boost circuit 100 presents a two stage voltage pump circuit that generates an output, boosted voltage (on output node NW_VPP) approximately 3 times a supply voltage Vdd. For example, output, boosted voltage of approximately 2.8 Volts (V) for a supply voltage Vdd of approximately 1V may be obtained using voltage boost circuit 100. However, as will be described herein, in contrast to conventional voltage boost circuits capable of attaining a 3Vdd boosted voltage, voltage boost circuit 100 may use lower voltage limit field effect transistors (FET) without lower performance, thicker gate oxide FETs. For example, voltage boost circuit 100 may use approximately 22 Angstrom (Å) gate oxide thickness FETs that can only withstand a gate oxide stress voltage of approximately 1.7V. As described herein, adjustment of the FET overdrive levels has been made so boosted voltages can be generated with FETs having lower voltage limits.

In one embodiment, voltage boost circuit 100 includes a first stage 110 and a second stage 112. Each stage 110, 112, respectively, includes a voltage boost capacitor C3, C4 having a low node L1, L2 and a high node V1, V2. Respectively, each stage 110, 112 also includes a restore circuit 120, 122 connecting ground-level to its low node L1, L2, and a precharge circuit 130, 132 connected to each high node V1, V2. Output passgates T32, T31 are also connected to each high node V1, V2, respectively, with a gate control circuit 140, 142 connected to each passgate T32, T31 providing an on-state gate voltage level adjusted to reduce oxide stress. Voltage boost circuit 100 may also include a timing signal circuit 150, which may include any now known or later developed circuitry for generating timing signals AA, BB, G1 and G2, described in greater detail herein.

Figure 2:
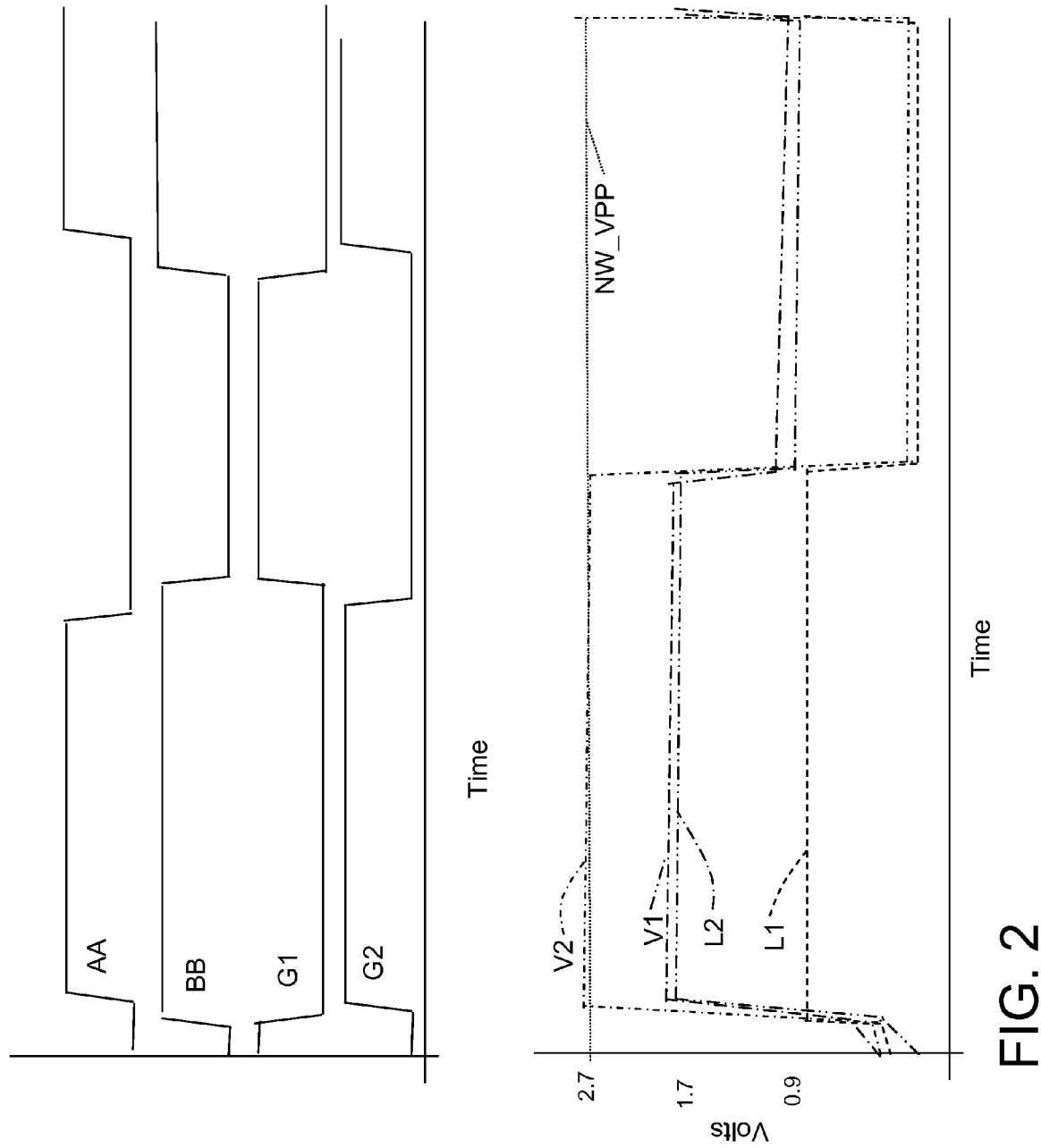
FIG. 2 shows a waveform plot showing inputs to the voltage boost circuit of FIG. 1.

FIG. 2 shows a 2-phase clock diagram of non-overlapping inputs AA and BB, non-overlapping inputs G1 and G2, capacitor nodes L1, V1, L2, V2 and output, boosted voltage NW_VPP. In one embodiment, non-overlapping inputs AA and BB may be approximately supply voltage level inputs, e.g., approximately 1.1V, and non-overlapping inputs G1 and G2 may be approximately at a stress limit voltage VPP. Stress limit voltage VPP is set at a voltage stress limit of devices used for a given technology. For example, stress limit voltage VPP may be approximately 1.7V for an oxide thickness of 22 Å.

Referring to FIGS. 1 and 2 collectively, in a precharge phase, input BB drives a restore device 120 (i.e., transistor T40) of first stage 110 to restore low node L1 of first stage 110 to ground (~0V). Contemporaneously, input G1 charges high node V1 of first stage 110 to a supply voltage Vdd by precharge circuit 130 (i.e., FET T42), and the gate of first stage passgate T32 is held in an off state at stress limit voltage VPP level by gate control circuit 140 (i.e., FET T36) controlled by input G2. Here, stress limit voltage VPP may be approximately twice supply voltage Vdd, e.g., approximately 1.7V. Second stage 112 is also held in precharge with low node L2 connected to ground (~0V) by restore circuit 122 (i.e., FETs T33 and T34) controlled by input G1, and second stage high node V2 is pre-charged to supply voltage Vdd by precharge circuit 132 (i.e., FET T45) controlled by input G1. Passgate T31 is held in an off state by gate control circuit 142 by input G2.

In a boost or transfer phase, input AA is driven high by timing circuit 150 which drives first stage low node L1 to supply voltage Vdd through FET T41. High node V1 increases to almost twice the supply voltage to 2Vdd. Conventionally, the twice supply voltage 2Vdd present on first stage high node V1 would exceed an oxide stress voltage limit of first stage passgate T32, e.g., of approximately 1.7V. This situation may occur, for example, when passgate T32 includes a 22 Å thick gate oxide. To address this situation, however, gate control circuit 140 includes a resistive voltage divider 144 formed by resistor R1 and resistor R2 activated by FETs T37 and T35, which produces an intermediate gate voltage (G2BUF) of approximately 300 millivolts (mV). (Resistive voltage divider 144 is disconnected from supply voltage Vdd by FET T35 in the precharge phase by signal AABUF, which is an inversion of input AA). Accordingly, with a gate voltage level of first stage passgate T32 held no lower than 300 mV, a first boosted voltage level on first stage high node V1 of approximately 2Vdd (e.g., ~1.7V) can be passed without exceeding the oxide stress voltage limit of first stage passgate T32. Hence, first stage passgate T32 may include lower voltage limit FETs, e.g., 22 Å gate oxide thickness FET, which reduces the additional cost and complexity of adding in a thicker gate oxide, lower performance FET for first stage passgate T32.

With passgate T32 in its on stage, first boosted voltage on first stage high node V1 is transferred to second stage low node L2. Second stage high node V2 then increases to a second boosted voltage of approximately 3Vdd (e.g., ~2.8V). Conventionally, a 3Vdd gate voltage present on second stage high node V2 would pose another gate oxide stress voltage level issue for passgate T31. However, gate control circuit 142 provides a low level voltage (e.g., ~1.1V) by action of a resistive divider 146 formed by resistor R3 and resistor R4 from output node NW_VPP and pulldown FETs T37 and T38, which are controlled by input G2. Hence, an on-state gate to source voltage level of second passgate T31 is approximately at a stress limit voltage VPP for a maximum supply voltage thereof. (The stress an FET experiences is proportional to the source/drain voltage minus its gate voltage. To operate in a safe region this gate-source voltage Vgs, gate-drain voltage Vgd must be held below the oxide stress limit which, for example, may be 1.7V for a 22 Å device. In an embodiment with an output voltage at the drain of output passgate T31 of 2.8V, the gate voltage may be 1.1V or above to stay below the oxide stress limit. In a second embodiment, when the passgate T31 voltage may be 2.95V at a higher supply voltage Vdd level, the gate may be at 1.25V or higher. The resistor stack is designed such that the oxide stress limit is not exceeded at the maximum power supply voltage. Second boosted voltage of approximately thrice the supply voltage 3Vdd on high node V2 is transferred to output node NW_VPP by second stage passgate T31.

In this second embodiment, this output boosted voltage may be approximately 2.95V with a supply voltage Vdd of 1.1V. Second stage passgate T31, however, receives an on-state gate voltage level (e.g., ~1.25V) which does not exceed a gate oxide voltage stress limit of a low voltage FET, which reduces the additional cost and complexity of adding in a thicker gate oxide, lower performance FET for second stage passgate T31.

Second stage passgate T31 is turned off without the use of high-voltage level translated phases by resistive coupling of the gate node thereof to the drain node thereof by resistor R4 of gate control circuit 142. In one embodiment, a clock frequency of voltage boost circuit 100 may be, for example, 74 megaHertz (MHz), which is slow enough to allow resistors R3 and R4 of resistive divider 146 to be sized large enough to consume a relatively small amount of the total voltage boost circuit 100 capacity. In one embodiment, resistor R3 is 8 K-ohms and resistor R4 is 10 K-ohms, drawing a root mean square (RMS) current of about 80 micro amps.

During the boost phase, precharge circuit 132 (i.e., FET T45) needs to be off to prevent output charge from bleeding back through to supply voltage Vdd. Conventional practice is to use stress limit voltage VPP, but this voltage is regulated to a voltage level less than high node V2 of second stage 122, while stress limit voltage VPP may be regulated to approximately 1.7V. Consequently, high node V2 of second stage 112 can rise to approximately 2.9V, causing part of the charge to pass through FET T45 of precharge circuit 132 and into a supply voltage Vdd node. Since stress limit voltage VPP is regulated to a lower voltage than high node V2 of second stage 122, it is insufficient to use stress limit voltage VPP to turn off precharge circuit 132. In order to address this situation, precharge circuit 132 resistively couples, through resistor R5, output node NW_VPP (indicated as G1BUF2) to a gate of FET T45. In contrast, in the precharge phase, precharge circuit 132 connects G1BUF2 to ground (~0V), through FETs T44 and T43 when timing signal G1 goes high. In the boost phase of operation, when timing signal G1 is at ground, FET T43 is isolated from output node NW_VPP (e.g., ~2.95V) on node G1BUF2 by FET T44, which has supply voltage Vdd level on its gate. Similarly, the gates of FET T34 of restore circuit 122 and FET T38 of gate control circuit 142 are shielded from boosted voltages by shielding FETs T33 and T37, respectively. As a result, precharge circuit 132 can swing between ground (~0V) and output node NW_VPP (3Vdd) without reliability concerns. Hence, precharge circuit 132 can be completely turned off in the boost phase, preventing leakage through precharge circuit 132 transistor T45.

A two stage voltage boost circuit 100 as described herein uses voltage levels other than ground, supply voltage Vdd and output, boosted voltage (3Vdd) to control the on and off levels of passgates T31, T32. Hence, the use of the disclosed resistor structures obviates the need for boosted phases and associated level translators.

It is understood that while particular illustrative electronic parameter levels (e.g., voltages, frequency, resistance, etc.) have been presented herein, the values presented are not limiting of the claimed disclosure since those with ordinary skill in the art will recognize that variations in the particular dimensions and structure of voltage boost circuit 100 may readily provide different electronic parameter levels.

Figure 3:
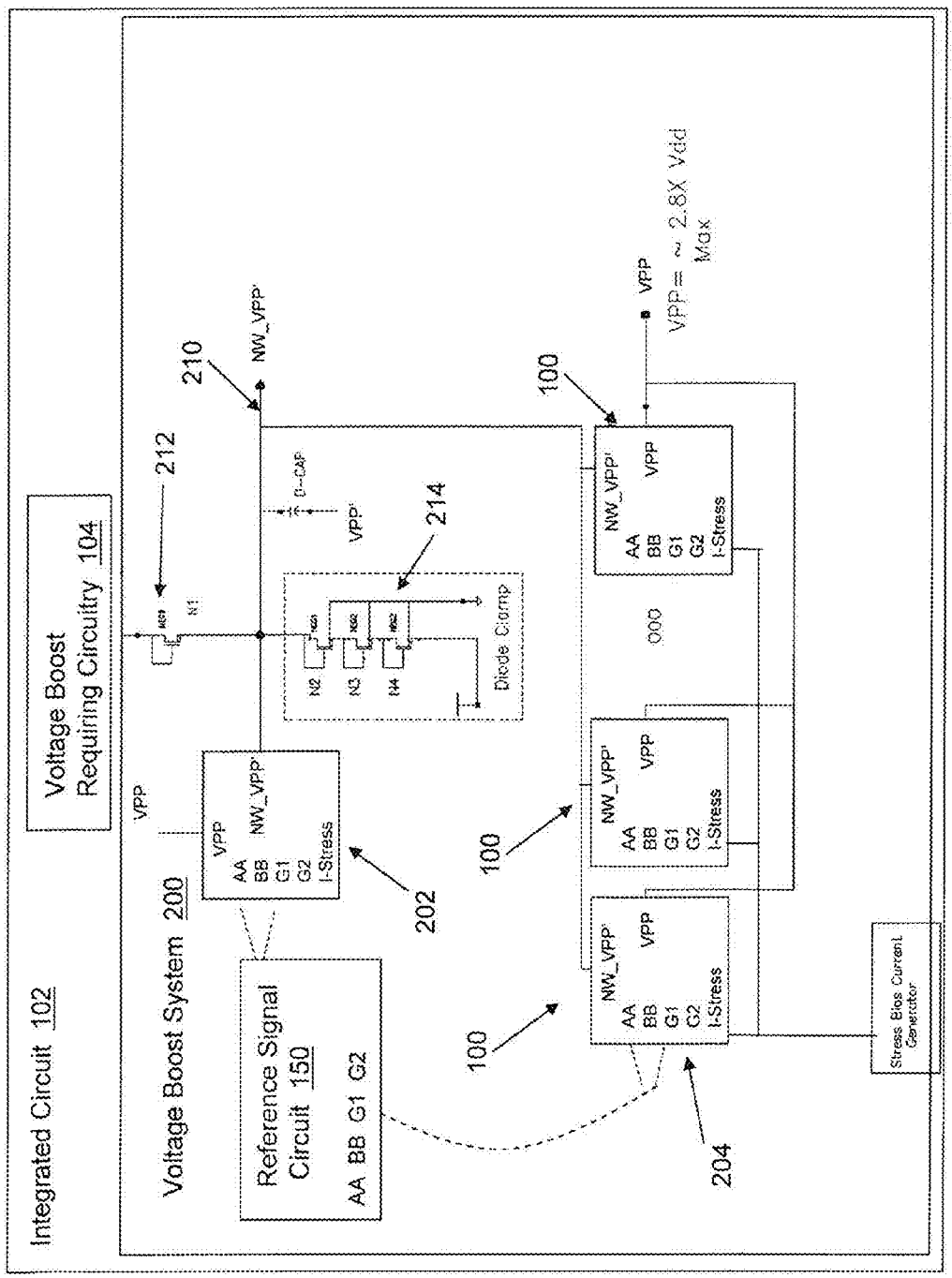
FIG. 3 shows a schematic diagram of a voltage boost system using voltage boost circuit(s) of FIG. 1 to provide a boosted n-well voltage.

Turning to FIG. 3, a voltage boost system 200 for boosting a supply voltage Vdd according to another embodiment of the disclosure is illustrated. One challenge relative to voltage boost circuit 100 is that an output stage 112 will rise to levels in excess of the regulated drain (output) voltage of passgate T31. The typical design approach is to bias the n-well of passgate T31 by tying it to the source or drain thereof. However, in a 3×Vdd voltage pump this would create a forward-biased junction and turn on a parasitic PNP device. The n-well voltage of passgate T31 needs to be equal to or higher than an output boosted voltage VPP (analogous to node NW_VPP in FIG. 1) to prevent forward biasing of an n-well, which would turn on a parasitic transistor and create a parasitic current path, rendering circuit 100 inoperable. System 200 provides an n-well voltage boost circuit 202 that provides a voltage (e.g., approximately 2.9-3.3 V) to make sure the n-wells in voltage boost circuits 100 (referred to herein as "sub-circuits 100" in this embodiment) are not forward biased.

As shown in FIG. 3, system 200 may include a first voltage boost circuit 204 producing a first boosted voltage VPP (stress limit voltage above) using at least one voltage boost sub-circuit 100. As illustrated, three voltage boost sub-circuits 100 are used; however, as those with skill in the art will recognize, one, two, three or more than three may be employed. Each of the at least one voltage boost sub-circuit 100 are substantially identical to voltage boost circuit 100, described herein. In addition, each voltage boost sub-circuit 100 includes an output passgate T31 (FIG. 1) in an n-well, i.e., an n-type doped silicon or silicon germanium well. Each voltage boost sub-circuit 100 has output passgate T31 (FIG.

1) with an on-state voltage level adjusted for reduced oxide stress using a resistive division of the first boosted voltage, as described herein.

Voltage boost system 200 also includes a second (n-well) voltage boost circuit 202 producing a second boosted voltage (NW_VPP'). As shown, n-well of each output passgate T31 (FIG. 1) is biased using second boosted voltage (NW_VPP'), which ensures the n-well in voltage boost sub-circuits 100 are not forward biased. Second boosted voltage (NW_VPP') is greater than first boosted voltage (VPP). For example, second boosted voltage (NW_VPP') may be approximately 2.9V to make sure the n-well in sub-circuits 100 are not forward biased, while first boosted voltage (VPP) may be regulated to approximately 1.7V for a 1.1V supply voltage (Vdd). Second voltage boost circuit 202 does not need a thicker, lower performance 52 Å transistor or additional level translators to make boosted phases at the nwell voltage level. First boosted voltage (VPP) of approximately 1.7V can be used to provide boosted input signals G1 and G2 to second boosted voltage circuit 202. A diode clamp 214 may be coupled to an output of second voltage boost circuit 202 to prevent an over voltage on node 210. The clamping circuit will conduct charge from node 210 if its voltage is greater than 3 FET Vt voltages above power supply Vdd, for example. NFET diode device 212 was included to provide a precharge path to output node 210 from the first boosted voltage, Vpp to establish a known initial condition on node 210 at power on time.

In operation, the same clock signals generated for FIG. 1, as shown in FIG. 2, may be used to operate voltage boost system 200. As previously described, phases AA and BB restore then boost the low nodes of voltage boost devices 202 and 204 and transfer and precharge functions are driven by the G1 and G2 signals as described for FIG. 1.

It is understood that while particular illustrative electronic parameter levels (e.g., voltages, frequency, resistance, etc.) have been presented herein, the values presented are not limiting of the claimed disclosure since those with ordinary skill in the art will recognize that variations in the particular dimensions and structure of voltage boost circuit 100 or voltage boost system 200 may readily provide different electronic parameter levels.

Voltage boost circuit 100 (FIG. 1) and/or voltage boost system 200 (FIG. 3) as described above may be part of the design for an integrated circuit chip. The chip design is created in a graphical computer programming language, and coded as a set of instructions on machine readable removable or hard media (e.g., residing on a graphical design system (GDS) storage medium).

Figure 4:
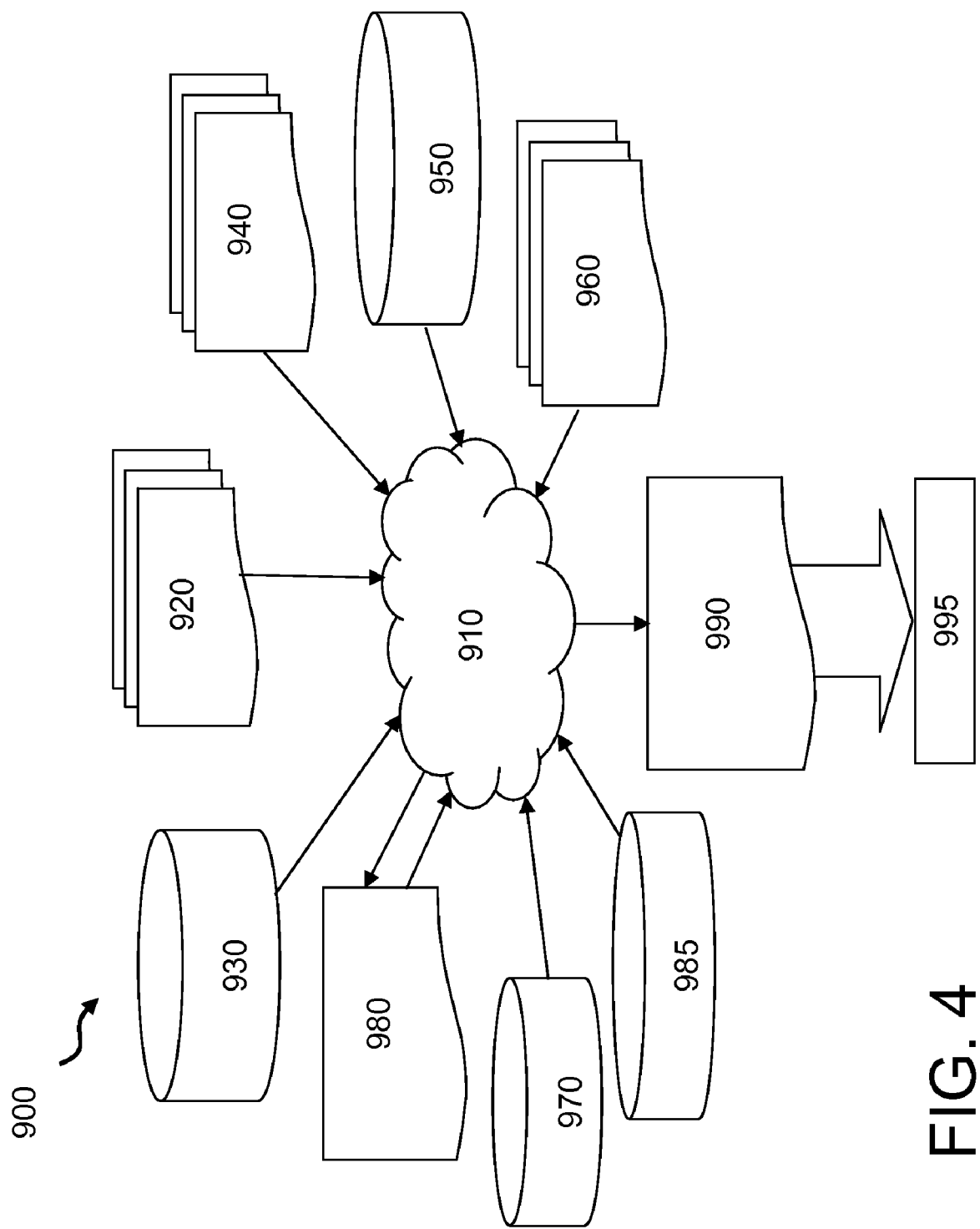
FIG. 4 shows a flow diagram of a design process used in semiconductor design, manufacturing, and/or test.

FIG. 4 shows a block diagram of an exemplary design flow 900 used for example, in semiconductor design, manufacturing, and/or test. Design flow 900 may vary depending on the type of IC being designed. For example, a design flow 900 for building an application specific IC (ASIC) may differ from a design flow 900 for designing a standard component. Design structure 920 is preferably an input to a design process 910 and may come from an IP provider, a core developer, or other design company or may be generated by the operator of the design flow, or from other sources. Design structure 920 comprises an embodiment of the disclosure as shown in FIGS. 1 and/or 3 in the form of schematics or HDL, a hardware-description language (e.g., Verilog, VHDL, C, etc.). Design structure 920 may be contained on one or more machine readable medium. For example, design structure 920 may be a text file or a graphical representation of an embodiment of the disclosure as shown in FIG. 1 and/or 3. Design process 910 preferably synthesizes (or translates) an embodiment of the disclosure as shown in FIG. 1 and/or 3 into a netlist 980, where netlist 980 is, for example, a list of wires, transistors, logic gates, control circuits, I/O, models, etc. that describes the connections to other elements and circuits in an integrated circuit design and recorded on at least one of machine readable medium. This may be an iterative process in which netlist 980 is re-synthesized one or more times depending on design specifications and parameters for the circuit.

Design process 910 may include using a variety of inputs; for example, inputs from library elements 930 which may house a set of commonly used elements, circuits, and devices, including models, layouts, and symbolic representations, for a supply manufacturing technology (e.g., different technology nodes, 32 nm, 45 nm, 90 nm, etc.), design specifications 940, characterization data 950, verification data 960, design rules 970, and test data files 985 (which may include test patterns and other testing information). Design process 910 may further include, for example, standard circuit design processes such as timing analysis, verification, design rule checking, place and route operations, etc. One of ordinary skill in the art of integrated circuit design can appreciate the extent of possible electronic design automation tools and applications used in design process 910 without deviating from the scope and spirit of the disclosure. The design structure of the disclosure is not limited to any specific design flow.

Design process 910 preferably translates an embodiment of the disclosure as shown in FIG. 1 and/or 3, along with any additional integrated circuit design or data (if applicable), into a second design structure 990. Design structure 990 resides on a storage medium in a data format used for the exchange of layout data of integrated circuits (e.g. information stored in a GDSII (GDS2), GL1, OASIS, or any other suitable format for storing such design structures). Design structure 990 may comprise information such as, for example, test data files, design content files, manufacturing data, layout parameters, wires, levels of metal, vias, shapes, data for routing through the manufacturing line, and any other data required by a semiconductor manufacturer to produce an embodiment of the disclosure as shown in FIG. 1 and/or 3. Design structure 990 may then proceed to a stage 995 where, for example, design structure 990: proceeds to tape-out, is released to manufacturing, is released to a mask house, is sent to another design house, is sent back to the customer, etc.

The structure as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A voltage boost system for boosting a supply voltage, the system comprising:
    a first voltage boost circuit producing a first boosted voltage using at least one voltage boost sub-circuit, each of the at least one voltage boost sub-circuit having an output passgate in an n-well, the output passgate with an on-state voltage level adjusted for reduced oxide stress using a resistive division of the first boosted voltage; and
    a second voltage boost circuit producing a second boosted voltage, the n-well of each output passgate being biased using the second boosted voltage,
    wherein the second boosted voltage is greater than the first boosted voltage.

2. The system of claim 1, wherein each of the at least one voltage boost sub-circuit includes:
    a first stage for boosting the supply voltage to a third boosted voltage, the first stage including a first voltage boost capacitor with a low node and a high node, the high node having an output of the third boosted voltage;
    a first passgate coupled to the high node of the first stage;
    a first gate control circuit for generating an on-state gate voltage level for the first passgate adjusted to reduce gate oxide voltage stress on the first passgate;
    a second stage for boosting the third boosted voltage to the first boosted voltage, the second stage including a second voltage boost capacitor with a low node coupled to the first passgate, and a high node, the high node of the second stage having an output of the first boosted voltage;
    a second passgate coupled to the high node of the second stage; and
    a second gate control circuit for generating an on-state gate voltage level for the second passgate adjusted to reduce gate oxide voltage stress on the second passgate.

3. The system of claim 2, wherein the third boosted voltage is approximately twice the supply voltage, and the second boosted voltage is approximately thrice the supply voltage.

4. The system of claim 2, wherein the on-state gate-voltage level for the first passgate is determined by a resistive division of the supply voltage.

5. The system of claim 2, wherein the on-state gate-voltage level for the second passgate is determined by a resistive division of the first boosted voltage.

6. The system of claim 2, further comprising a restore circuit coupled to the low node of each boost capacitor for selectively coupling each low node to ground.

7. The system of claim 2, further comprising:
    a first precharge circuit coupled to the high node of the first stage for selectively precharging the high node to the supply voltage; and
    a second precharge circuit coupled to the high node of the second stage for selectively precharging the high node to the supply voltage.

8. The system of claim 2, wherein the on-state gate to source voltage level of the second passgate is approximately at a stress limit voltage for a maximum supply voltage thereof.

9. The system of claim 1, further comprising a diode clamp coupled to an output of the second voltage boost circuit.

10. An integrated circuit (IC) designed to substantially operate at a supply voltage, the IC comprising:
    circuitry requiring a boosted voltage relative to the supply voltage;
    a voltage boost system including:
        a first voltage boost circuit producing a first boosted voltage using at least one voltage boost sub-circuit, each of the at least one voltage boost sub-circuit having an output passgate in an n-well, the output passgate with an on-state voltage level adjusted for reduced oxide stress using a resistive division of the first boosted voltage; and
        a second voltage boost circuit producing a second boosted voltage, the n-well of each output passgate being biased using the second boosted voltage,
        wherein the second boosted voltage is greater than the first boosted voltage and the second boosted voltage is the boosted voltage required by the circuitry.

11. The IC of claim 10, wherein each of the at least one voltage boost sub-circuit includes:
    a first stage for boosting the supply voltage to a third boosted voltage, the first stage including a first voltage boost capacitor with a low node and a high node, the high node having an output of the third boosted voltage;
    a first passgate coupled to the high node of the first stage;
    a first gate control circuit for generating an on-state gate voltage level for the first passgate adjusted to reduce gate oxide voltage stress on the first passgate;
    a second stage for boosting the third boosted voltage to the first boosted voltage, the second stage including a second voltage boost capacitor with a low node coupled to the first passgate, and a high node, the high node of the second stage having an output of the first boosted voltage;
    a second passgate coupled to the high node of the second stage; and
    a second gate control circuit for generating an on-state gate voltage level for the second passgate adjusted to reduce gate oxide voltage stress on the second passgate.

12. The IC of claim 11, wherein the third boosted voltage is approximately twice the supply voltage, and the second boosted voltage is approximately thrice times the supply voltage.

13. The IC of claim 11, wherein the on-state gate-voltage level for the first passgate is determined by a resistive division of the supply voltage, and the on-state gate-voltage level for the second passgate is determined by a resistive division of the first boosted voltage.

14. The IC of claim 11, further comprising:
    a first precharge circuit coupled to the high node of the first stage for selectively precharging the high node to the supply voltage; and a second precharge circuit coupled to the high node of the second stage for selectively precharging the high node to the supply voltage.

15. The IC of claim 10, further comprising a diode clamp coupled to an output of the second voltage boost circuit.

16. A design structure embodied in a machine readable medium for designing, manufacturing, or testing an integrated circuit (IC), the design structure comprising:
  an IC designed to substantially operate at a supply voltage, the IC including:
  circuitry requiring a boosted voltage relative to the supply voltage;
  a voltage boost system including:
    a first voltage boost circuit producing a first boosted voltage using at least one voltage boost sub-circuit, each of the at least one voltage boost sub-circuit having an output passgate in an n-well, the output passgate with an on-state voltage level adjusted for reduced oxide stress using a resistive division of the first boosted voltage; and
    a second voltage boost circuit producing a second boosted voltage, the n-well of each output passgate being biased using the second boosted voltage,
  wherein the second boosted voltage is greater than the first boosted voltage and wherein the second boosted voltage is the boosted voltage required by the circuitry.

17. The design structure of claim 16, wherein the design structure comprises a netlist.

18. The design structure of claim 16, wherein the design structure resides on storage medium as a data format used for the exchange of layout data of integrated circuits.

19. The design structure of claim 16, wherein the design structure includes at least one of test data, characterization data, verification data, or design specifications.

* * * * *